US006897583B2

United States Patent
Doeffinger et al.

(10) Patent No.: US 6,897,583 B2
(45) Date of Patent: May 24, 2005

(54) ELECTRICAL MACHINE WITH AIR-COOLED CONTROL CHIP

(75) Inventors: Andreas Doeffinger, Leonberg (DE); Achim Henkel, Reutlingen (DE); Frank Himmler, Reutlingen-Betzingen (DE); Thomas Bilsing, Beonigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/258,693

(22) PCT Filed: Feb. 16, 2002

(86) PCT No.: PCT/DE02/00576

§ 371 (c)(1),
(2), (4) Date: Mar. 4, 2003

(87) PCT Pub. No.: WO02/071580

PCT Pub. Date: Sep. 12, 2002

(65) Prior Publication Data

US 2003/0173847 A1 Sep. 18, 2003

(30) Foreign Application Priority Data

Mar. 2, 2001 (DE) ......................................... 101 10 128

(51) Int. Cl.$^7$ ................................................. H02K 9/06
(52) U.S. Cl. .......................... 310/68 D; 310/58; 310/64; 310/59; 310/52; 310/63
(58) Field of Search .............................. 310/58, 52, 65, 310/89, 68 D, 64, 63

(56) References Cited

U.S. PATENT DOCUMENTS

| 3,666,978 A | * | 5/1972 | Renner ........................ 310/89 |
| 4,293,788 A |   | 10/1981 | Binder ....................... 310/239 |
| 4,799,309 A |   | 1/1989 | Cinzori et al. ............ 310/68 D |
| 5,250,864 A | * | 10/1993 | Kusumoto et al. ............ 310/58 |
| 5,675,205 A |   | 10/1997 | Jacob et al. ................. 310/237 |
| 5,686,780 A | * | 11/1997 | Adachi et al. ............ 310/68 D |
| 5,729,063 A |   | 3/1998 | Adachi et al. ............ 310/68 D |
| 5,907,203 A | * | 5/1999 | Chen et al. .................... 310/65 |
| 6,020,662 A | * | 2/2000 | Chen et al. .................... 310/52 |
| 6,060,802 A | * | 5/2000 | Masegi et al. ............ 310/68 D |
| 6,081,054 A | * | 6/2000 | Kashihara et al. ............ 310/58 |
| 6,184,602 B1 | * | 2/2001 | Ooiwa et al. ................. 310/58 |
| 6,492,752 B2 | * | 12/2002 | Ishida ......................... 310/89 |
| 6,522,045 B2 | * | 2/2003 | Ikeda et al. .................... 310/52 |
| 6,538,352 B2 | * | 3/2003 | Asao ............................ 310/58 |
| 6,586,853 B2 | * | 7/2003 | Ishida et al. .................. 310/58 |

FOREIGN PATENT DOCUMENTS

| DE | 31 37 172 A1 | 3/1983 | ........... H02K/9/06 |
| DE | 40 28 464 A1 | 3/1992 | ........... H02K/9/06 |
| DE | 695 09 949 T2 | 3/2000 | ........... H02K/9/06 |
| EP | 125834 A2 | * 11/1984 | ........... H02K/9/06 |
| JP | 52041813 A | * 3/1977 | .......... H02K/19/36 |
| JP | 52041814 A | * 3/1977 | .......... H02K/19/36 |
| JP | 05219704 A | * 8/1993 | .......... H02K/19/36 |

* cited by examiner

*Primary Examiner*—Kabl Tamai
*Assistant Examiner*—Yahveh Comas
(74) *Attorney, Agent, or Firm*—Michael J. Striker

(57) ABSTRACT

In an electrical machine, in particular a generator for a motor vehicle, having a housing (2), a rotor (6), supported rotatably in the housing (2) about a pivot axis (5), at least one fan wheel (20), connected to the rotor (6), for generating a cooling air flow (22, 22', 22") from at least one intake opening (37; 37'; 37") disposed in the housing (2) to at least one outlet opening (24) disposed in the housing (2), and at least one regulator chip (31), disposed on a chip holder (30), for regulating the current generation, it is provided that the chip holder (30) is disposed such that it is bathed at least in part directly by the cooling air flow (22, 22', 22"). As a result of this arrangement, it is attained that a very high heat transfer coefficient is present, because of the high flow speed of the cooling air flow (22, 22', 22").

7 Claims, 4 Drawing Sheets

_US 6,897,583 B2_

ELECTRICAL MACHINE WITH AIR-COOLED CONTROL CHIP

BACKGROUND OF THE INVENTION

The invention relates generally to an electrical machine, in particular a generator for a motor vehicle.

From U.S. Pat. No. 5,907,203, a generator for a motor vehicle is known in which a voltage regulator is connected electrically to the slip ring assembly. The generator has a cooling conduit, which extends past a voltage regulator. The voltage regulator includes a housing, a printed circuit board, and a regulator chip, which are mounted on a fastening plate. The fastening plate of the regulator directly adjoins the cooling air conduit. The cooling air conduit is created by a spacer element, which spaces the fastening plate apart from the generator housing. A disadvantage of this embodiment is that the printed circuit board with the regulator chip is mounted on an additional fastening plate. The heat transfer to the aspirated cooling air is restricted by the fastening plate on which the regulator chip is mounted. Accordingly, the cooling air flow does not come into direct contact with the printed circuit board or the regulator chip. Moreover, because of the spacer element, a larger installation space is needed, which adversely affects the size of the generator. Moreover, higher production costs result from the additional costs for material and assembly.

It is accordingly the object of the invention to create an electrical machine, in particular a generator, with improved cooling of the regulator.

The nucleus of the invention is that the chip holder is disposed such that it is bathed at least in part directly by the cooling air flow. In accordance with further features of the invention, it is proved advantageous to dispose the chip holder at a point where the speed of the cooling air flow is especially high, because the heat transfer is quite pronounced at that point.

BRIEF DESCRIPTION OF THE DRAWINGS

The invention is described in further detail below in terms of preferred exemplary embodiments in conjunction with the drawing. Shown are.

DETAILED DESCRIPTION OF THE PREFERRED EMBODIMENT

Figure 1:
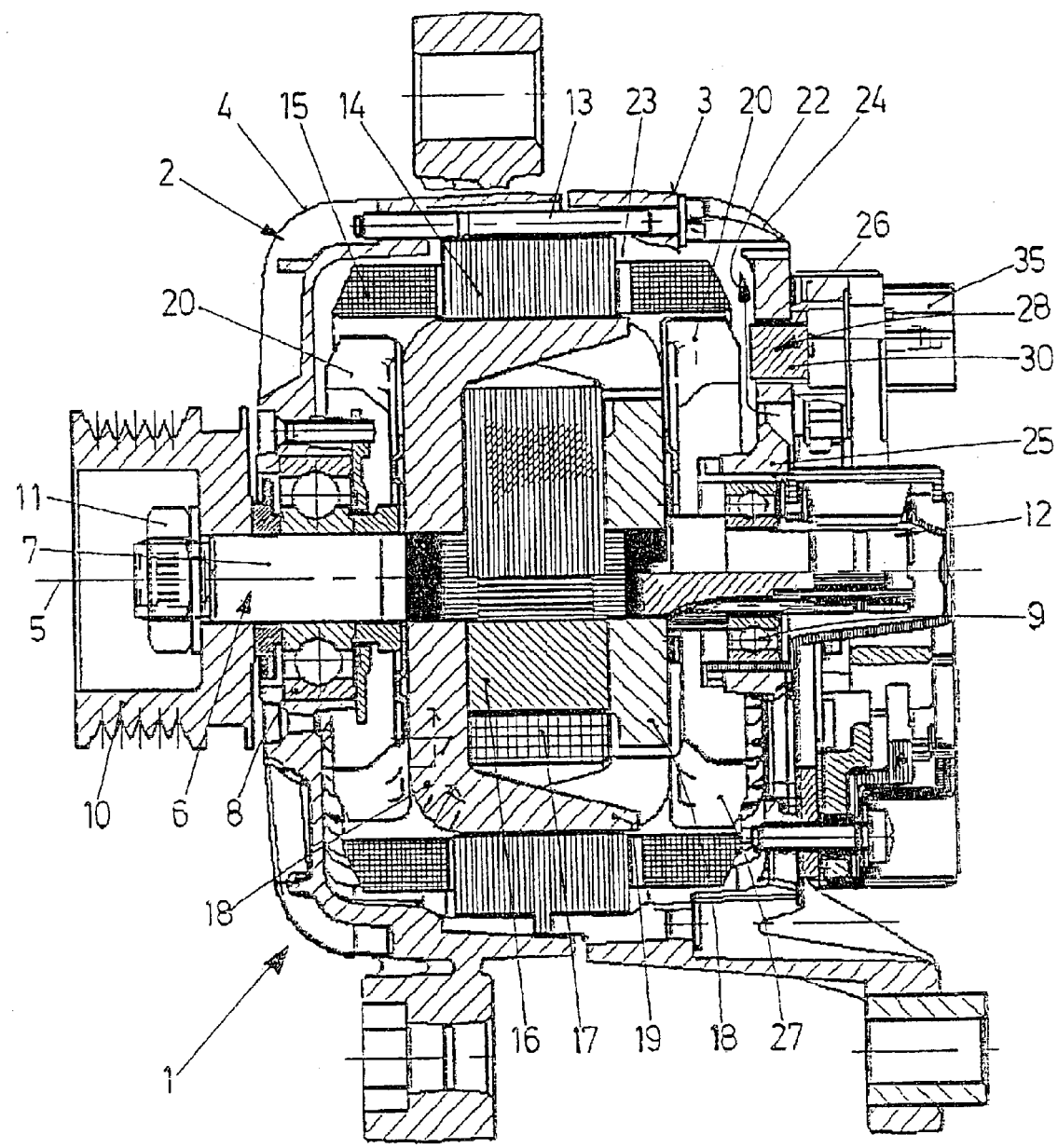
FIG. 1, a cross section through a generator with a claw pole rotor in a first embodiment.
Figure 2:
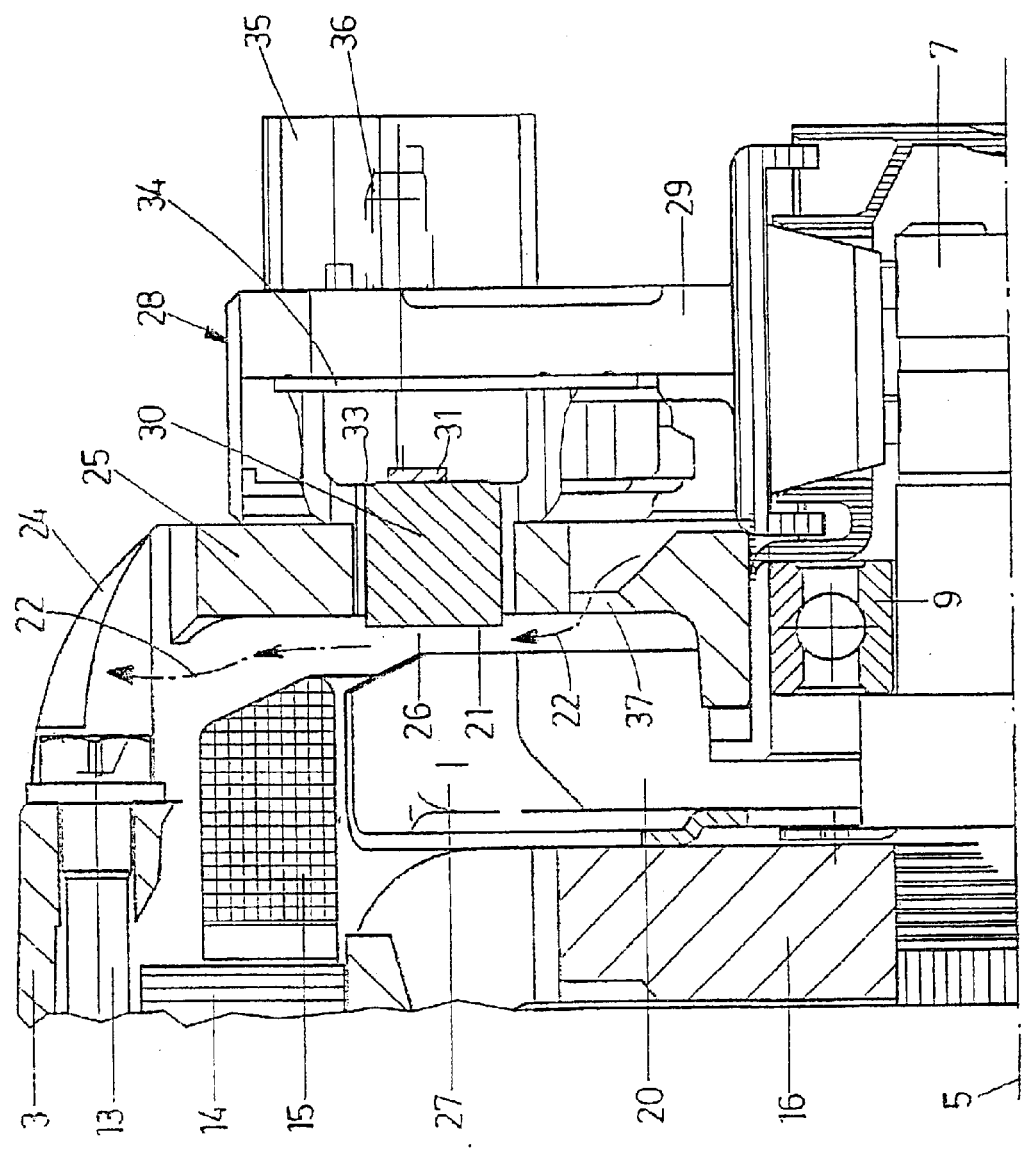
FIG. 2, an enlarged detail of the view of FIG. 1 of the generator regulator and slip ring bearing plate, in a first embodiment.

A first embodiment of the invention will be described below, referring to FIGS. 1 and 2. An electrical machine, in this exemplary embodiment a generator 1, for motor vehicles, in a diecast housing 2 comprising two housing halves 3 and 4, has a claw pole rotor 6, which is supported rotatably about a pivot axis 5 and has a shaft 7. Outside housing half 4, a pulley 10 is mounted, secured by a nut 11, on the end of the rotor shaft 7 in order to drive the rotor 6. A slip ring assembly 12 is provided on the other end of the rotor shaft 7. The slip ring assembly 12 includes slip rings on the rotor shaft 7. The slip rings cooperate with carbon brushes in a known manner. The supporting of the rotor shaft 7 is effected by means of two ball bearings 8 and 9. The housing half 4 is embodied as a bearing plate for the ball bearing 8 on the drive side, and the ball bearing 8 takes on the function of the fixed bearing. The housing half 3 is embodied as a slip ring bearing plate 25 for the ball bearing 9 on the slip ring side; the ball bearing 9 is embodied smaller and in the form of a loose bearing. The two housing halves 3 and 4, joined together by screws 13, fix a central stator lamination packet 14, which in a known manner receives a three-phase stator winding 15 for generating a rotary current. The rotor shaft 7, in its middle region on a magnetically conductive annular core 16, carries a rotor winding 17, which is equivalent to an exciter winding. Claw pole jacks 18 that axially directly adjoin the annular core 18 and rotor winding 17 at the front and back are secured to the rotor shaft 7. The claw pole prongs 19 of the claw pole jacks 18 engage on another with spacing to form an alternating field. One fan wheel 20 is mounted on each of the outer face ends of the claw pole jacks 18 on the rotor shaft 7; because of the rotation of the rotor shaft 7, it axially aspirates ambient air through slits, not shown, in the housing half 3 and feeds it radially, past the winding head 23, toward the slip ring, of the stator winding 15 to the outside through radial outlet openings 24. The fan wheel 20 disposed on the drive-side face end of the claw pole jack 15 likewise aspirates ambient air axially through slits, not shown, in the housing half 4 and blows them through outlet openings to the outside, past the front winding head of the stator winding 15. The generator 1 is accordingly air-cooled. The supply of current to the rotor winding 17 is effected through the slip ring assembly 12, of which one slip ring each is electrically connected to one end of the rotor winding 17. On the side of the fan wheel 20 toward the slip ring and remote from the claw pole jack 18, the slip ring bearing plate 25 is spaced apart somewhat, and a regulator 28 is integrated with it in a recess 26 in the region of the fan blade 27. The regulator 28 regulates the direct current flowing in the rotor winding 17 to suit the demands of the on-board electrical system of a motor vehicle.

In a regulator housing 29, the regulator 28 includes a chip holder 30 of rectangular cross section, with a smaller regulator chip 31 secured directly on it and likewise having a rectangular cross section. Alternatively, the regulator chip 31 can be secured by adhesive bonding or soldering. The chip holder 30 of the regulator 28 is surrounded by a lateral thermal insulation 33. The regulator housing 29 is closed by a protective cap 34. A plug unit 35 with a connection 36 is disposed in the regulator housing 29, on the outer face end of the housing half 3.

In the generator 1, the chip holder 30 is located in the recess 26 in the slip ring bearing plate 25, and with a plastic layer that forms the thermal insulation 33, the chip holder 30 is thermally insulated from the slip ring bearing plate 25. Heating of the regulator chip 31 by the slip ring bearing plate 25 is prevented by this insulation 33. The underside 21 of the chip holder 30, oriented toward the fan wheel 20 on the side toward the slip ring, protrudes somewhat from the recess 26 into the interior of the generator 1. In the slip ring bearing plate 25, there is a separate intake opening 37 for a cooling air flow 22 located between the ship holder 30, mounted in the recess 26, and the rotor shaft 7.

The cooling of the regulator chip 31 is accomplished in that the cooling air flow 22 is aspirated through the intake opening 37 by means of the fan wheel 20 toward the slip ring and is then blown inward, along the slip ring bearing plate 25, to the outlet openings 24. In the process, the cooling air flow 22 passes the underside 21 of the chip holder 30 that has become heated by the regulator chip 31. For this reason, the chip holder 30 comprises a highly heat-conductive material. Because of its thermal insulation 33, excessive heating of the regulator 28 from the component temperature of the slip ring bearing plate 25 is prevented. The underside 21 of the chip holder 30 is placed directly on the fan blades 27, because very high flow speeds and hence high heat transfer coefficients of the cooling air flow 22 occur there. Since the waste heat is dissipated there especially well, efficient cooling of the regulator 28 is achieved. Thus the generator 1 can be used for applications that involve relatively high ambient temperatures.

Cooling of the regulator 28 without a separate cooling body is possible because of this arrangement, resulting in a very economical regulator 28. To enhance the cooling effect still more, the possibility also exists of providing cooling fins on the chip holder 30, to increase the surface area. In addition, the regulator chip 31 is secured to a leadframe or a bus, which extend directly within the cooling air flow 22. In this connection, a leadframe is understood to mean buses originally communication with one another through a frame. The cooling of the regulator chip 31 is further improved because of this arrangement.

Figure 3:
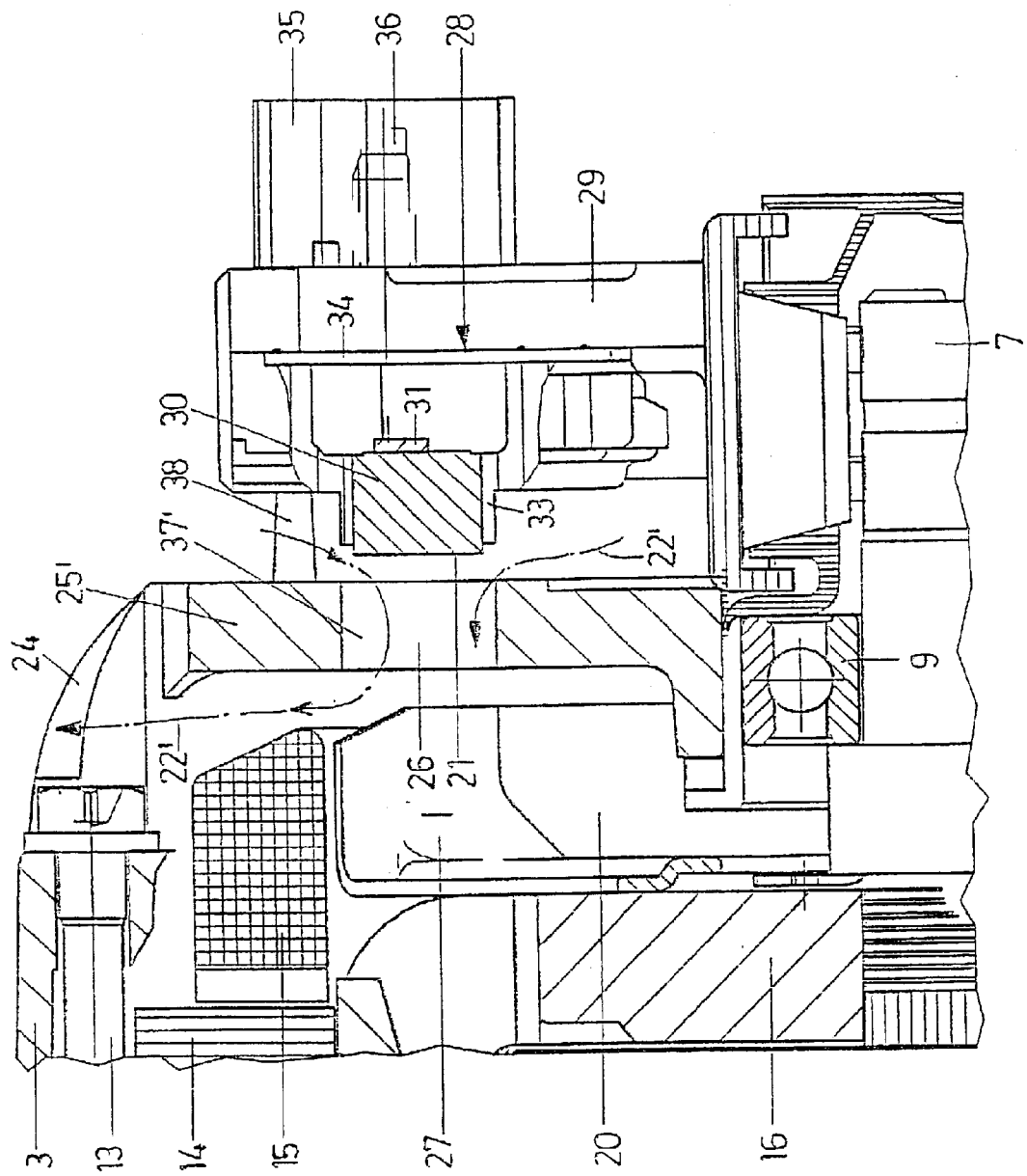
FIG. 3, a cross section as in FIG. 2, through a second embodiment.

A second embodiment of the invention will now be described, in conjunction with FIG. 3. Identical parts are assigned the same reference numerals as in the first exemplary embodiment, whose description is hereby referred to. Structurally different but functionally identical parts are assigned the same reference numerals, with a prime.

This exemplary embodiment differs in that the regulator 28 is secured at a distance from the slip ring bearing plate 25' by means of two spacers 38; it can also be secured with more than two spacers 38. The chip holder 30 of the regulator 28 is accordingly disposed in front of the intake opening 37' positioned in the region of the fan wheel blade 27; that is, it is positioned outside the housing half 3. The cooling air flow 22' is aspirated through the intake opening 37' by the fan wheel 20 toward the slip ring and is then blown out radially through the outlet openings 24. In this exemplary embodiment, the recess 26 forms the intake opening 37'.

The cooling is achieved because the cooling air flow 22' first flows past the chip holder 30 before being carried through the intake opening 37' to the fan wheel 20. The chip holder 30 is capable of dissipating the waste heat from its underside 21 and laterally to the cooling air 22'. The surface area of the chip holder 30 bathed by the flow is increased in size, in comparison with the first embodiment, so that better cooling is achieved. This embodiment is preferable above all whenever the cooling air flow 22' through the fan wheel 20 toward the slip ring has already been heated excessively, and adequate cooling of the regulator 28 can no longer be accomplished. Thus the chip holder 30 is disposed at a point where the speed of the cooling air flow 22', because of the immediate vicinity of the face-end fan wheel 20, is especially high, making efficient cooling attainable.

Figure 4:
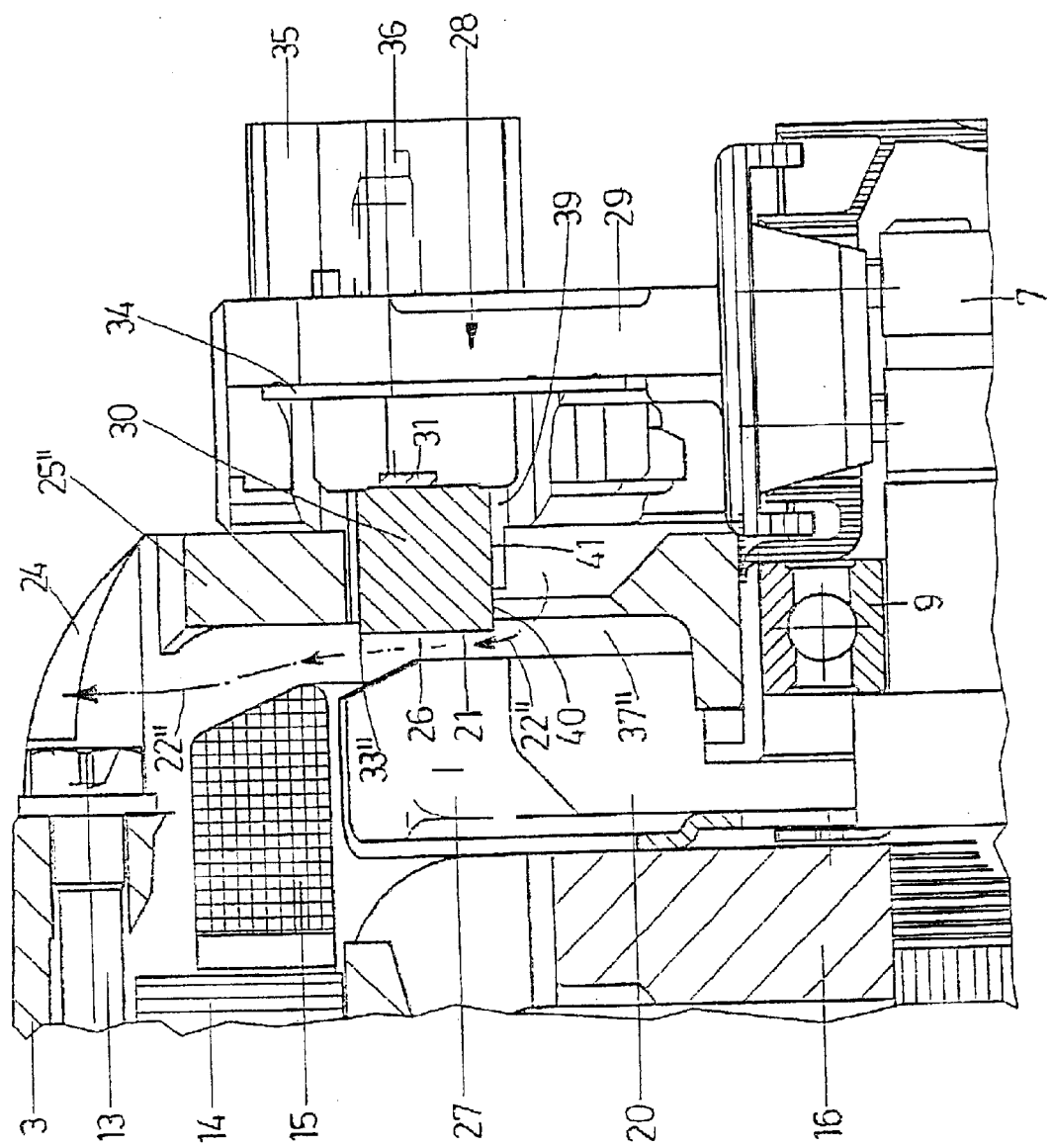
FIG. 4, a cross section as in FIG. 3, through a third embodiment.

A third embodiment of the invention will now be described, in conjunction with FIG. 4. Identical parts are once again assigned the same reference numerals as in the first exemplary embodiment, whose description is hereby referred to. Structurally different but functionally identical parts are therefore assigned the same reference numerals, with a double prime. The regulator 28 is once again placed with its chip holder 30 in a recess 26 directly on the fan wheel blades 27. The underside 21 of the chip holder 30 protrudes somewhat into the interior of the generator 1. The intake opening 37" is disposed in the slip ring bearing plate 25" directly on the side, toward the rotor shaft 7, of the chip holder 30. The thermal insulation 33" is embodied along the intake opening 37" only over a portion 39 of the side 41 of the chip holder 30, thus creating a face 40 without the thermal insulation 33".

In this embodiment, the cooling function is accomplished in that the cooling air flow 22", which is not heated, is aspirated axially through the intake opening 37" by means of the fan wheel 20 on the side toward the slip ring bearing and is blown out radially through the outlet openings 24. Since the intake opening 37" is positioned directly on the chip holder 30, waste heat from the chip holder 30 is already dissipated in the intake opening 37". In addition, the underside 21, extending parallel to the fan wheel 20, is likewise bathed by the cooling air flow 22". Since the thermal insulation 33" on the side 41 is embodied in shortened form, and the cooling air flow 22" meets the face 40 directly at the chip holder 30, the heat transfer in this region is further reinforced. Thus the heat dissipation in this embodiment takes place both at the non-insulated face 40 and on the underside 21 of the chip holder 30 by means of the cooling air flow 22". Once again, the chip holder 30 is disposed at a point where the speed of the cooling air flow 22" is especially high. The longitudinal dimensions of the generator 1 in this embodiment are shortened by the length of the spacers 38, compared to the embodiment described in FIG. 2. In comparison to the embodiment shown in FIG. 1, the heat dissipation is improved because of the larger bathed surface area. The cooling of the regulator 28 is effected by partly heated and not heated air of the cooling air flow 22".

What is claimed is:

1. An electrical machine in the form of a generator for a motor vehicle, comprising:

a housing (2);

a rotor (6), supported rotatably in the housing (2) about a pivot axis (5);

at least one fan (20), connected to the rotor (6), for generating a cooling air flow (22") from at least one intake opening (37") disposed in the housing (2) to at least one outlet opening (24) disposed in the housing (2); and at least one regulator chip (31), directly disposed on a chip holder (30), for regulating the current generation, wherein the chip holder (30) is disposed such that it is bathed at least in part directly by the cooling air flow (22"), is received in a recess (26) in the housing (2), and is thermally insulated by a thermal insulation (33") from the housing (2), wherein the at least one intake opening (37") in the housing (2) disposed immediately adjacent the chip holder (30) in the housing (2), so that waste heat from the chip holder (30) is already dissipated in the intake opening (37").

2. The electrical machine of claim 1, wherein the chip holder (30) is a leadframe or a bus.

3. The electrical machine of claim 1, wherein the chip holder (30) is disposed at a point where the speed of the cooling air flow (22") is especially high.

4. The electrical machine of claim 1, wherein the chip holder (30) comprises a highly heat-conductive material.

5. An electrical machine in the form of a generator for a motor vehicle, comprising:

a housing (2);

a rotor (6) supported rotatably in the housing (2) about a pivot axis (5);

at least one fan (20) connected to the rotor (6) for generating a cooling air flow (22) from at least one intake opening (37) disposed in the housing (2) to at least one outlet opening (24) disposed in the housing (2); and at least one regulator chip (31) directly disposed on a chip holder (30) for regulating current generation, wherein the chip holder (30) is disposed such that the chip holder is bathed at least in part directly by the cooling air flow (22), is received in a recess (28) in the housing (2), and is thermally insulated by a thermal insulation (33) from the housing (2), wherein the at least one intake opening (37) in the housing 92) is spaced apart from the chip holder (30) in the housing (2).

6. An electrical machine in the form of a generator for a motor vehicle, comprising a housing (2);

a rotor (6), supported rotatably in the housing (2) about a pivot axis (5);

at least one fan (20), connected to the rotor (6), for generating a cooling air flow (22") from at least one intake opening (37") disposed in the housing (2) to at least one outlet opening (24) disposed in the housing (2); and at least one regulator chip (31), directly disposed on a chip holder (30), for regulating the current generation, wherein the chip holder (30) is configured integrally, is disposed such that it is bathed at least in part directly by the cooling air flow (22"), is received in a recess (26) in the housing (2), and is thermally insulated by a thermal insulation (33") from the housing (2), wherein the at least one intake opening (37) in the housing (2) is disposed immediately adjacent the chip holder (30) in the housing (2), so that waste heat from the chip holder (30) is already dissipated in the intake opening (37").

7. An electrical machine in the form of a generator for a motor vehicle, comprising a housing (2);

a rotor (6), supported rotatably in the housing (2) about a pivot axis (5);

at least one fan (20), connected to the rotor (6), for generating a cooling air flow (22) from at least one intake opening (37) disposed in the housing (2) to at least one outlet opening (24) disposed in the housing (2); and at least one regulator chip (31), directly disposed on a chip holder (30), for regulating the current generation, wherein the chip holder (30) is configured integrally, is disposed such that it is bathed at least in part directly by the cooling air flow (22), is received in a recess (26) in the housing (2), and is thermally insulated by a thermal insulation (33) from the housing (2), wherein the at least one intake opening (37) in the housing (2) is spaced apart from the chip holder (30) in the housing (2).

* * * * *